United States Patent
Horoszczak et al.

(10) Patent No.: US 11,585,611 B2
(45) Date of Patent: Feb. 21, 2023

(54) DUCT HEAT EXCHANGER

(71) Applicant: Hamilton Sundstrand Corporation, Charlotte, NC (US)

(72) Inventors: Adam Horoszczak, Wrocław (PL); Rafal Lewandowski, Zarow (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 278 days.

(21) Appl. No.: 16/709,974

(22) Filed: Dec. 11, 2019

(65) Prior Publication Data
US 2020/0224978 A1 Jul. 16, 2020

(30) Foreign Application Priority Data
Jan. 15, 2019 (EP) .................................... 19461504

(51) Int. Cl.
- *F28D 7/02* (2006.01)
- *F28F 1/40* (2006.01)
- *F28D 7/00* (2006.01)

(52) U.S. Cl.
CPC .................. *F28F 1/40* (2013.01); *F28D 7/00* (2013.01); *F28D 7/022* (2013.01)

(58) Field of Classification Search
CPC .. F28D 7/02; F28D 7/022; F28D 7/026; F28F 1/40
See application file for complete search history.

(56) References Cited

U.S. PATENT DOCUMENTS

| 1,673,918 | A | 6/1928 | Mauran |
| 2,449,822 | A * | 9/1948 | Schibbye ................ F28D 7/024 165/163 |
| 7,669,644 | B2 | 3/2010 | Alessandrini et al. |
| 9,835,380 | B2 | 12/2017 | Kupiszewski et al. |
| 9,932,905 | B2 | 4/2018 | Suciu et al. |
| 10,018,424 | B2 | 7/2018 | Zaffetti et al. |
| 2008/0190593 | A1 * | 8/2008 | Wang ........................ F28F 9/22 165/159 |
| 2011/0104350 | A1 * | 5/2011 | Clusserath .............. F28D 7/022 426/519 |

(Continued)

FOREIGN PATENT DOCUMENTS

| CH | 250747 A | 9/1947 | |
| DE | 102008056810 A1 * | 5/2010 | ............. F02M 26/25 |

(Continued)

OTHER PUBLICATIONS

European Search Report for Application No. 19461504.3, dated Apr. 8, 2019, 7 pages.

*Primary Examiner* — Eric S Ruppert
(74) *Attorney, Agent, or Firm* — Cantor Colburn LLP

(57) ABSTRACT

A duct comprising: an inlet; an outlet; a shell having a tubular form extending between the inlet and the outlet; a main flow path (H) within the shell for conveying a main flow between the inlet and the outlet; and a heat exchange structure, wherein the heat exchange structure comprises: an intake port provided in the shell; an output port provided in the shell; and a secondary flow path (C) within the shell for conveying a secondary flow between the intake port and the output port, wherein the secondary flow path is spirally intertwined with the main flow path for a section of the duct to provide a heat exchanger within the duct.

20 Claims, 4 Drawing Sheets

(56) References Cited

U.S. PATENT DOCUMENTS

| | | | |
|---|---|---|---|
| 2013/0133855 A1* | 5/2013 | Kim | F02M 21/0212 165/41 |
| 2015/0300745 A1* | 10/2015 | Kolb | F28D 7/022 165/156 |
| 2017/0292791 A1 | 10/2017 | Zaffetti et al. | |
| 2017/0370652 A1 | 12/2017 | Lopes | |
| 2018/0106561 A1 | 4/2018 | Diffey et al. | |
| 2018/0202722 A1 | 7/2018 | Jackson et al. | |
| 2019/0011190 A1 | 1/2019 | Kolb | |

FOREIGN PATENT DOCUMENTS

| | | |
|---|---|---|
| DE | 102010007249 A1 | 8/2011 |
| EP | 0037790 A1 | 10/1981 |
| NL | 1008248 A1 | 8/1999 |

* cited by examiner

DUCT HEAT EXCHANGER

FOREIGN PRIORITY

This application claims priority to European Patent Application No. 19461504.3 filed Jan. 15, 2019, the entire contents of which is incorporated herein by reference.

FIELD

The disclosure relates to a duct that includes a heat exchanger and a method of manufacturing the same.

BACKGROUND

Heat exchangers are required within aircraft structures to regulate temperatures of working fluids as well as to scavenge heat from one system for use in another. Every heat exchanger consumes space within such an aircraft structure. They also usually need complicated mounting features and they will generally add weight to the aircraft structure. There is a desire to solve one or more of these problems.

SUMMARY

Viewed from one aspect, the present disclosure can be seen to provide a duct comprising an inlet, an outlet, a shell having a tubular form extending between the inlet and the outlet, a first flow path within the shell for conveying a first flow between the inlet and the outlet, and a heat exchange structure. The heat exchange structure comprises an intake port provided in the shell, an output port provided in the shell and a second flow path within the shell for conveying a second flow between the intake port and the output port. In the duct, the second flow path is spirally intertwined with the first flow path for a section of the duct to provide a heat exchanger within the duct.

In addition to the features described above, the first flow path and the second flow path may comprise intertwined spiral channels that are formed by a spiral wall arranged within the shell.

In addition to one or more of the features described above, the spiral wall may extend radially from an outer surface of a spine to an inner surface of the shell.

In addition to one or more of the features described above, the spiral wall may have a first surface in contact with the first flow path and a second surface in contact with the second flow path. This relationship of the first surface being in contact with the first flow path and the second surface being in contact with the second flow path, may be maintained along the length of the heat exchanger.

In addition to one or more of the features described above, the spiral wall may provide a double helix structure within the shell for the spiral channels with a pitch angle of less than 20°. Optionally the pitch angle may be less than 10°. The pitch angle may be constant along the length of the heat exchanger.

In addition to one or more of the features described above, the shell may comprise one or more bends between the inlet and the outlet. Optionally the shell may comprise a bend in a first direction and a bend in a second direction which is different to the first direction to provide a duct with an S-shaped shell.

In addition to one or more of the features described above, the spiral channels may comprise a plurality of helical turns and a thickness direction of the spiral wall may be varied to maintain a uniform cross-sectional flow area in each of the spiral channels through all the helical turns around a bend. Optionally the spiral wall may comprise internal blind cavities, for example, closed cells extending within a radial extent of the spiral wall. Optionally the spiral wall may comprise a thickness which increases from an inside of a bend to an outside of a bend. The thickness of the spiral wall at the outside of the bend may be greater than the thickness of the spiral wall for a straighter section. In addition or alternatively, for a straight section of the shell, a constant thickness of the spiral wall may be maintained.

In addition to one or more of the features described above a radial extent of a channel may be less at an outside of a bend than at an inside of the bend to maintain a uniform cross-sectional flow area in each of the spiral channels through all the helical turns around a bend.

In addition to one or more of the features described above, the duct may comprise a first section downstream of the inlet in which the shell defines a first portion of the first flow path where the second flow path is absent, a second section downstream of the first section and positioned between the output port and the intake port comprising the heat exchanger where the first flow path and the second flow path are present and spirally intertwined, and a third section downstream of the heat exchanger and leading to the outlet where the shell defines a second portion of the first flow path where the second flow path is absent.

In addition to one or more of the features described above, the intake port and the output port may be provided with necks which extend from the shell for connection to a supply and return of heat exchanger medium.

In addition to one or more of the features described above, the heat exchanger may comprise a spine formed by inner portions of the first flow path and the second flow path that extends in a longitudinal direction of the duct. Optionally the spine may be hollow and comprises a valve to provide a bypass flow for the first flow path. The valve may be activated automatically by excessive pressure or via a control system.

In addition to one or more of the features described above, one or more of a spiral wall, a spine or the shell, which together define a flow path area of a flow path within the heat exchanger, comprise one or more blind cavities internally within the spiral wall, spine and/or shell. Optionally wherein, the one or more blind cavities are provided to take account of different flow rates within the first and second flow paths.

In addition to one or more of the features described above, the duct, including the heat exchanger provided by the spirally intertwined first flow path and second flow path, may have been formed by an additive manufacturing process. Optionally the additive manufacturing process may be a laser bed fabrication process.

Viewed from another aspect, the present disclosure can be seen to provide a method of making a duct comprising forming a shell having a tubular form to define an inlet and an outlet of the duct, the duct providing a first flow path within the shell for conveying a main flow between the inlet and the outlet, forming a heat exchange structure within the duct, the heat exchange structure comprising an intake port formed in the shell, an output port formed in the shell and a second flow path formed within the shell for conveying a second flow between the intake port and the output port. In the method, forming the heat exchange structure comprises forming the second flow path so that it is spirally intertwined with the first flow path for a section of the duct to provide a heat exchanger within the duct.

In addition to the features described above, the duct may be formed by an additive manufacturing process. The additive manufacturing process may be a laser bed fabrication process or similar process comprising a laser which is used to fuse powder particles together to build the duct. The forming of the heat exchange structure may take place concurrently with the forming of the shell in such a fabrication process.

In addition to one or more of the features described above, a spiral wall may be formed within the shell of the duct to provide an internal structure having a double helix form of spiral channels. Optionally a thickness of the spiral wall may be varied such that the thickness of the spiral wall is thinner towards an inside of a bend in the shell, and is wider towards an outside of the bend in the shell.

The present disclosure may also extend to an aircraft comprising one or more ducts comprising a heat exchanger as described above. The one or more ducts comprising a heat exchanger may be part of an OBIGGS unit within the aircraft.

BRIEF DESCRIPTION OF FIGURES

Certain embodiments will be described below in greater detail by way of example only and with reference to the accompanying drawings, in which.

DETAILED DESCRIPTION

Figure 1:
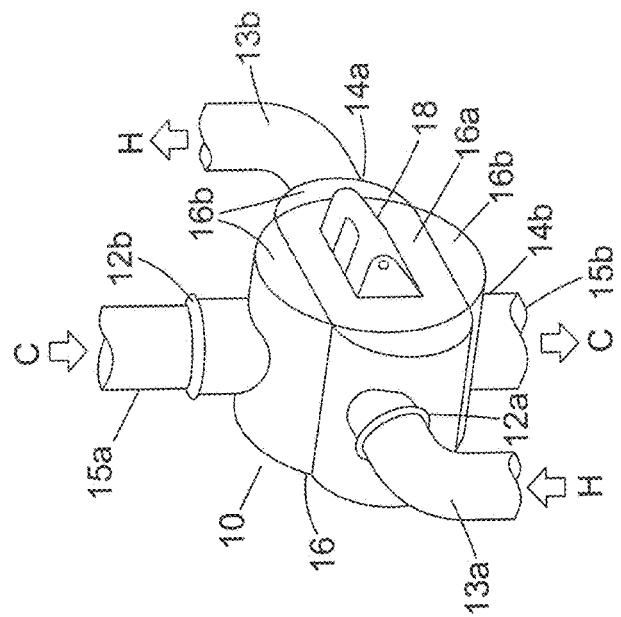
FIG. 1 is a perspective view of a conventional plate fin heat exchanger.

FIG. 1 shows a conventional plate fin heat exchanger 10 for use within an aircraft system. In the figure, the plate fin heat exchanger 10 has a first flow path for a hot fluid H and a second flow path for a cold fluid C. The hot and cold fluid flow paths H, C enter and exit the heat exchanger 10 via the inlets 12a, 12b and outlets 14a, 14b, the respective inlets and outlets being arranged opposite each other on a housing 16. The hot fluid H is conveyed to and from the heat exchanger 10 by a pair of ducts 13a, 13b, and the cold fluid C is conveyed to and from the heat exchanger 10 by a pair of ducts 15a, 15b.

Within the housing 16 of the heat exchanger 10, the hot and cold fluid flow paths H, C intersect through a series of heat exchanger plates (not shown) to transfer heat. The exchange of heat might be, for example, to regulate the temperature of the hot fluid by extracting heat with the cold fluid. In the illustrated heat exchanger 10, the heat exchanger plates are located within the box-shaped, central part 16a of the housing 16, and the fluid flows H, C are divided across a plurality of intersecting channels by headers provided in the curved portions 16b of the housing 16, arranged every 90° around the housing 16.

This type of heat exchanger 10, while it is thermodynamically efficient, consumes a significant amount of space within an aircraft structure. It also adds weight to the aircraft structure and usually requires complex mounting arrangements. For example, a mounting arrangement may need to be provided within an already congested space for supporting the heat exchanger 10 via bracket 18.

In an aircraft, it is beneficial to keep component size and weight to a minimum. There may also be fewer options for mounting the heat exchanger 10 in an aircraft.

It may also be desirable to transfer heat from one system to another, for example, where efficiencies can be improved through regulating or modifying the temperature in a flow of working fluid, or where heat (or cooling) can be scavenged from one system to the advantage of another. However, often there is not the space available for mounting a conventional plate fin heat exchanger within the existing aircraft structure.

Figure 2:
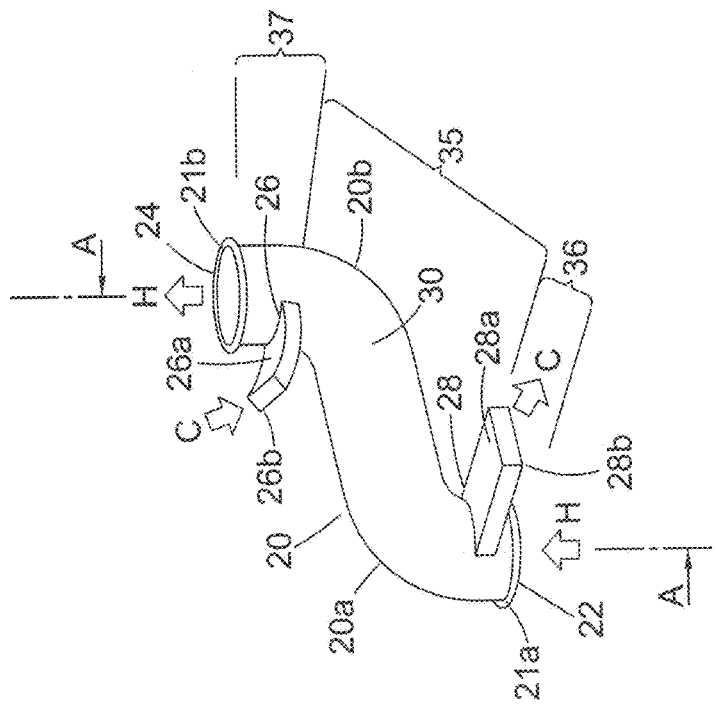
FIG. 2 is a perspective view of a duct incorporating a heat exchanger in accordance with an exemplary embodiment of the present disclosure.

According to the present disclosure, the conventional heat exchanger is replaced with a modified duct 20, as shown in FIG. 2, which incorporates an integral heat exchanger. In this way, less space is needed than for the conventional heat exchanger 10.

Moreover, the new duct 20 allows for an existing duct in an aircraft structure to be improved by replacing it for a duct 20 as described herein; in order to offer heat exchange functionality without requiring additional space and/or additional mounting points.

The duct 20 comprises a tubular shell 30 that can be shaped to wrap around and fit past other components in a region which is restricted on space. The duct 20 with the internal heat exchanger needs only to take up the room occupied by an existing duct within an aircraft structure.

The duct 20 may comprise a non-regular shape, for example, with one, two or more bends 20a, 20b along its length. In the illustrated example of FIG. 2, the duct 20 follows an S-shape comprising two main bends 20a, 20b in different directions. However, the current disclosure is not limited to such shapes and other configurations (simpler as well as more complex) are contemplated.

In FIG. 2, the tubular shell 30 of the duct 20 is shown of being substantially constant diameter along its length. This would be a typical solution so that the duct 20 can fit within the space available. However, it would also be possible for the duct 20 to be other shapes, particularly at the ends, where it may not be truly circular in cross-section for all or part of its length. For example, depending on the spacing of neighbouring components, it may be possible to form the shell 30 to a more organic shape than shown to make use of available space. Moreover, for reasons that will become apparent below, the shell 30 may have a slightly distorted shape to help maintain a more uniform fluid flow around a bend 20a, 20b. It may comprise a slight bulge or other distortion too, while maintaining a smooth spiral flow within the heat exchanger.

Regardless of the specific configuration, the shell 30, should generally still have an overall external form which would be consistent with that of a duct, albeit modified to provide the heat exchange functionality.

Thus the duct 20 of the present disclosure, can be seen from one aspect as a duct heat exchanger. It is a duct with an internal heat exchanger.

The duct 20 can be shaped to follow an existing path within the aircraft structure, for example, where it is being used to replace a previous duct without heat exchange functionality. The duct 20 can also rely on existing fixing points, avoiding the need for complicated fixing structures. Incorporating the heat exchanger within the existing envelope of a duct can also help to reduce the weight of the heat exchanger arrangement compared to fitting a conventional heat exchanger of larger dimensions.

Thus the duct 20 has an outer shell 30 which encloses a heat exchanger 35, which will be described in more detail below. The shell 30 is tubular in nature and extends from an inlet 22 to an outlet 24, for example, as shown in FIG. 2. The shell 30 contains and directs a first flow path, for example, a main flow path, as it travels along the duct 20 between the inlet 22 and outlet 24. In the embodiment of FIG. 2 this is indicated as a hot fluid flow H.

The duct 20 also comprises an intake port 26 and an output port 28 in the shell 30. The intake port 26 and the output port 28 are provided by orifices in the circumferential surface defined by the shell 30. A second flow path, for example, a secondary flow path for a cold fluid flow C, is then defined between the intake port 26 and the output port 28 to provide a heat exchanger 35 within the shell 30.

In this exemplary embodiment, the main flow path is the first flow path and is for a hot fluid H and the secondary flow path is the second flow path and carries the cold fluid C to extract heat and regulate the temperature of the hot fluid H; however it will be appreciated that the first/main flow path could carry the cold fluid C and the second/secondary flow path could be provided with a hot fluid H to input heat into the cold fluid C.

The embodiment in FIG. 2 also shows the first/main and second/secondary flow paths H, C flowing in opposite directions within the heat exchanger 35 to increase the efficiency of the heat exchanger 35. It will be appreciated that it is possible for both flow paths to be in the same longitudinal direction. In the description below, in relation to the flow paths and flows contained therein, the terms "first" and "main" can be used interchangeably, and similarly "second" and "secondary" can be used interchangeably.

Also the intake port 26 and the output port 28 may be provided at different positions to that shown on the shell 30, for example, closer to or further from an end 21a, 21b of the duct 20, as desired.

The intake port 26 and the output port 28 may include extended portions providing necks 26a, 28a as shown to facilitate connection with other ducts conveying the secondary flow C. The necks 26a, 28a may extend from the outer surface of the shell by 10 mm or more. While the necks 26a and 28a are shown comprising rectangular shaped apertures at their distal ends 26b, 28b, the cross-section of these necks 26a, 28a could vary, for example, to provide round or ovalised apertures at the distal ends 26b, 28b, as desired.

The duct 20 with the heat exchange functionality may be used with any combination of fluids, such as liquid-liquid, liquid-gas or gas-gas heat exchange. In the context of aerospace, the fluids are most likely to be gaseous, i.e., that the duct 20 would comprise a main flow which is a gas and a secondary flow to regulate or modify the working temperature of the main flow which is also a gas. It could include two or more of: atmospheric air, cabin air, engine gas flow, exhaust flow, engine oil, generator oil, coolant, fuel and so on.

Figure 3:
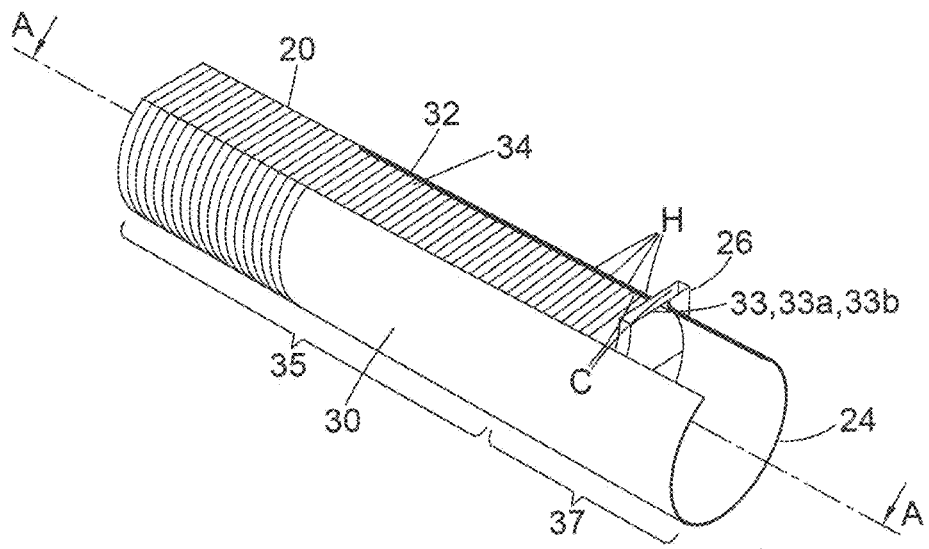
FIG. 3 is a perspective cut-away view showing a portion of a duct incorporating a heat exchanger in accordance with an exemplary embodiment.

FIG. 3 shows an exemplary embodiment of a portion of the duct 20 with the shell 30 partially removed to display the internal structure of the duct 20. The secondary flow path C is spirally intertwined with the main flow path H, such that they provide a section of the duct 20 with a heat exchanger 35.

The heat exchanger 35 is formed by the secondary flow path extending between the intake port 26 and the output port 28, providing the heat exchange structure. The heat exchanger 35 may extend along substantially the entire length of the duct 20, for example, greater than 60%, or even 75% of the length of the duct 20. In one example, the section comprising the heat exchanger 35 represents over 85% of the length of the duct 20.

Thus in the embodiment of FIG. 2, the duct 20 can be seen to comprise three sections. A first section 36 downstream of the inlet 22 in which the shell 30 defines a first portion of the main flow path H where the secondary flow path is absent. A second section of the duct 20 downstream of the first section 36 and positioned between the output port 28 and the intake port 26 comprises the heat exchanger 35 where the main flow path H and the secondary flow path C are present and spirally intertwined. A third section 37 of the duct 20 downstream of the heat exchanger 35 and leading to the outlet 24 where the shell 30 defines a second portion of the main flow path H where the secondary flow path is absent.

Depending on the thermal requirements of the duct 20 and the configuration of the surrounding aircraft structure, the heat exchanger 35 may extend along a smaller section of the duct 20, or conceivably, a second or further heat exchanger 35 may be formed within the duct 20 through the provision of additional intake and output ports 26, 28 (not shown).

As can be seen in FIG. 3, the main flow path and the secondary flow path are intertwined such that they form a double helix structure with two spiral channels 32, 34 within the duct 20. The main flow path passes along one of the spiral channels 32 and the secondary flow path passes along the other spiral channel 34. The pair of spiral channels are separated by a spiral wall 33 forming the double helix structure of the heat exchanger 35 and dividing the flow paths H, C.

At each point along the heat exchanger 35, the spiral wall 33 may have a first surface 33a in contact with the main flow path H and a second surface 33b in contact with the secondary flow path C. Embodiments are also envisaged where an additional heat exchanger fluid is provided within the duct 20, for example, within a further intertwined spiral channel within the heat exchanger 35.

The intake port 26 shown in FIG. 3 is for the secondary flow C and may project outwardly from the surface of the shell 30 to form the neck 26a shown in FIG. 2. The intake port 28 is rectangular in cross section, corresponding to the cross-section of the spiral channel 34, and offset to one side of the duct axis A-A. The output port 28, not visible in FIG. 3, could comprise a similar configuration.

As can be seen from this figure, the heat exchanger 35 is effectively provided by the three-dimensional spiral form of the secondary flow path C provided within the shell 30. The main flow path H in this section with the heat exchanger 35 can be seen as the remaining flow area between the turns of the secondary flow path C.

The duct 20 shown in FIG. 3 is a straight duct. However, in practice, the duct 20 may usually comprise a more organic shape, for example, the duct 20 may comprise one or more bends 20a, 20b along its length such that it can fit around other components within the system, for example, an S shape as shown in FIG. 2.

Figure 4:
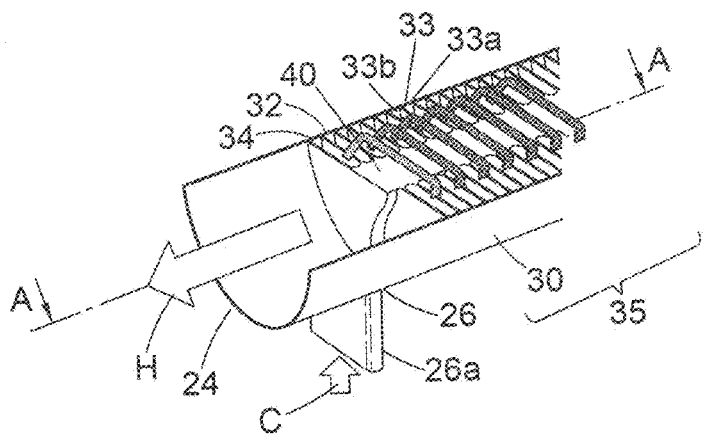
FIG. 4 is a perspective cut-away view showing a portion of a duct incorporating a heat exchanger in accordance with an exemplary embodiment.

FIG. 4 shows an outlet end 21b of an exemplary embodiment of the duct 20 in more detail, and in particular the flow path of the cold fluid flow C within the heat exchanger 35. In this embodiment the main flow H spirals in an anticlockwise direction through the spiral channel 32 of the heat exchanger 35 to exit via outlet 24. By contrast, the secondary flow C enters the shell 30 through the intake port 26 from the neck 26a and follows the spiral channel 34 in the opposite spiral direction to the main flow H, in this case a clockwise spiral direction indicated by the arrows in the figure. Heat transfer occurs between the two fluids along the heat exchanger 35 and the secondary flow exits the shell 30 via output port 28.

The intake port 26 and output port 28 may be at opposite or non-aligned orientations.

The spiral directions can of course be reversed, and the secondary flow C could follow an anti-clockwise spiral direction while the main flow H follows a clockwise spiral direction.

Figure 5:
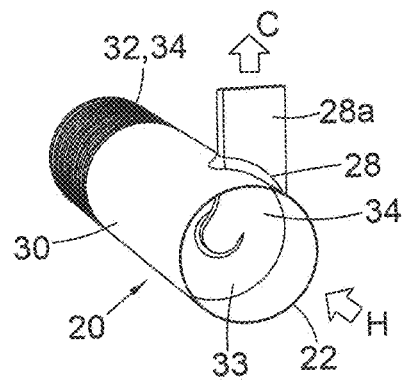
FIG. 5 shows a perspective end view of a portion of a duct incorporating a heat exchanger in accordance with an exemplary embodiment.

FIG. 5 shows a perspective end view of a duct 20 illustrating the output port 28 and the intersection of the secondary flow path C with the shell 30 in more detail. Looking through the inlet 22 of the main flow path H, it is possible to see the start of the spiral channel 34 for the secondary flow path C which is defined by the spiral wall 33 dividing the flows. Between the turns of the spiral channel 34, the main flow path H will follow an intertwined helical path within its own spiral channel 32 defined in part by the spiral wall 33.

The rear portion of the duct 20 illustrated in the figure is shown with the shell 30 omitted to show the intertwined spiral channels 32, 34 continuing within the duct 20. The intake port 26 (not shown) of the duct 20 may be configured in a similar way.

The spiral wall 33 forming the spiral channels 32, 34 may comprise the same helical pitch along the length of the heat exchanger 35. In a section of the duct 20 with a constant radius, this will maintain a constant cross-sectional area of spiral passage for the respective spiral channels 32, 34. Where it is desirable to vary a flow rate within the heat exchanger 35, the helical pitch may be increased or decreased as appropriate. The helical pitch of one spiral channel 32 may correspond to the helical pitch of the other spiral channel 34 since they are intertwined.

The spiral wall 33 may provide a double helix structure within the shell for the spiral channels by dividing the flows. The spiral wall 33 may provide a double helix structure with a pitch angle α of less than 20°. The pitch angle α may be less than 10°. The spiral channels 32, 34 may have the same axial depth along the heat exchanger 35, i.e., that the distance between the surfaces of the spiral wall 33 for each channel 32, 34 in the longitudinal direction is kept the same. The radial width of the spiral channels 32, 34 may correspond to the radial distance between the shell 30 and a spine 40 extending centrally within the duct 20. The channels may have substantially rectangular flow areas, defined on two sides by the surfaces of the spiral wall 33 and on the other two by a portion of the spine 40 and a portion of the shell 30. The channels 32, 34 could comprise rectangular flow areas with rounded corners. The cross-sectional flow area of the main flow path may be the same as the cross-sectional flow area of the secondary flow path, though it would also be possible for the flow areas to be different.

As shown in FIG. 4, the spiral channels 32, 34 may be wrapped around the spine 40 to form the double helix structure. The spine 40 can provide a supporting member or back bone for both the shell 30 of the duct 20 and the spirally intertwined channels 32, 34 formed around it. In this way, the internal structure can be self-supporting and transfer load from the heat exchanger 35 to the ends 21a, 21b of the duct 20 where the conventional fixing points are usually located.

The width of the spine 40 is defined by the inner diameter of the spiral channels 32, 34. In the exemplary embodiment, these are shown with the same inner diameter, but it would be possible to have different inner diameters to accommodate different flow requirements.

In a similar way the inner surface of the shell 30 for one channel 32, 34 may be a different internal radius than for the other of the channels 32, 34 to accommodate different flow requirements.

The different internal diameters and radii could be provided by forming the spine 40 and/or shell 30 with different wall thicknesses, for example, when 3D printing the duct 20. However the different wall thicknesses could also be provided through the provision of internal blind cavities in order to reduce the overall weight of the part.

Figure 6:
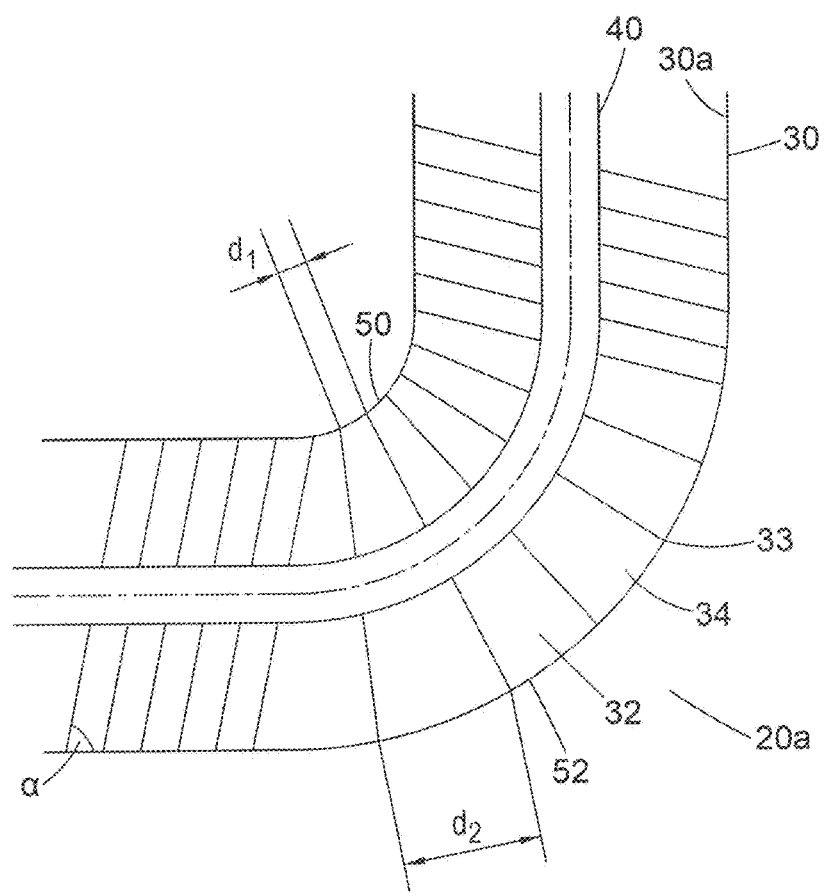
FIG. 6 shows a cross-section of a bend portion (exaggerated) of a duct with a heat exchanger.
Figure 7:
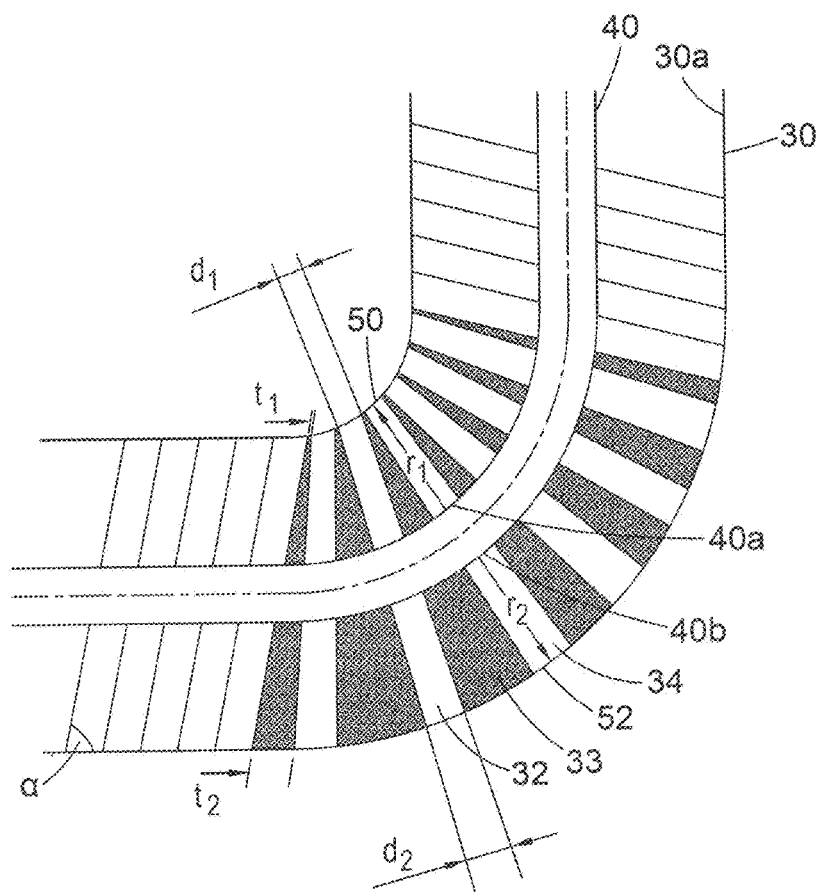
FIG. 7 shows a cross-section of a similar bend portion with the thickness of the channel walls modified in accordance with an exemplary embodiment.

In one exemplary embodiment, the spine 40 may be hollow in order to act as a by-pass channel in the event that a blockage occurs in the main flow path or when a heat exchange function is not required for a given along fluid. FIGS. 6 and 7 show the spine 40 as a hollow tube.

The duct 20 can be formed by additive manufacturing methods, for example, by using laser bed fabrication. This process enables complex shapes such as the double helix internal structure of the heat exchanger 35 to be formed simply. Due to the relatively low pitch angle of the double helix channels (e.g., less than 20°), the duct 20 can be printed easily without requiring additional internal supports. There is therefore some synergy with the configuration of the internal structure and additive manufacturing fabrication. In particular the radial extent of the spiral wall 33, the helical path of the spiral channels and tubular nature of the shell 30 allows the duct 20 to be fabricated easily, forming the heat exchanger 35 in combination with the shell 33 when building the duct in a longitudinal direction (for example, with the axis A-A extending substantially vertically from a bed of powder in a laser bed fabrication apparatus. However, conceivably the duct could also be made using conventional manufacturing methods, for example, through being cast in two halves and joined together or through an investment casting technique.

The use of additive manufacturing in particular allows the duct to be shaped to fit a specific space without requiring new moulds. For example, it may be formed with one or more bends 20a, 20b in order to fit within an existing aircraft system. Thus the duct 20 can be tailored in its configuration to fit within an existing space within the aircraft system, following a path through existing components. It can also be formed with suitably shaped profiles at the inlet/outlet 22, 24 and/or intake port/output port 26/28, for example, a circumferentially extending rib (not shown).

FIG. 6 shows, in cross-section, an exaggerated illustration of a bend 20a in the duct 20. On the left-hand side of FIG. 6, the spiral channels 32, 34 have a uniform, substantially rectangular cross-section. As they follow around the bend 20a the cross-sectional shape changes to follow the curvature of the bend 20a. The spiral wall 33 in this arrangement then defines a tapering space with a narrow end d1 at the inside 50 of the bend and a wider end d2 at the outside 52 of the bend 20a such that d1 is less than d2 in FIG. 6.

In order to avoid pressure differences within the heat exchanger 35 the internal structure of the heat exchanger 35 may be adapted to maintain a uniform cross-sectional flow area in each of the spiral channels 32, 34. Such adaptions can be easily incorporated into the design of a duct 20 which is made by additive manufacturing.

In one exemplary embodiment, the thickness t of the spiral wall 33 may be varied in order to maintain a constant cross-sectional flow area in the spiral channels 32, 34.

FIG. 7 shows an exemplary embodiment of a similar bend 20a in the duct 20 but where the thickness t of the spiral wall 33 varies from a minimum t1 at the inside 50 of the bend 20a to a maximum t2 at the outside of the bend 52, i.e., t1<t2. The variation in thickness t may be a linear relationship, such that the spiral wall 33 appears as a tapered shape, for example, a triangular or pointed shape, when viewed in cross-section as shown in FIG. 7. Such an adaption can be easily accomplished with additive manufacturing to provide a constant cross sectional flow area in each of the spiral channels 32, 34 along the length of the heat exchanger 35.

As an alternative, the spiral walls 33 may be hollow or comprise blind cavities. This can easily be incorporated into the design of the duct 20 and will reduce the overall weight of the duct 20. The presence of hollow spiral walls 33 or walls comprising internal blind cavities also allows for the cross sectional flow area of one or both of the main flow path H or secondary flow path C to be varied, for example, to take account of different flow rates within the flow paths H, C.

Alternatively or in addition, the radial extent r of the spiral channels 32, 34 may be varied around the bend such that the cross sectional flow area of each of the spiral channels 32, 34 remains uniform as the helical turns extend around the bend 20a. This can be achieved through altering the configuration of the shell 30 by drawing it out from the centre on the inside 50 of the bend 20a or by drawing it in towards the centre on the outside 52 of the bend 20a, to adjust the cross-sectional flow area to make it more uniform. Thus the shell 30 may be viewed as having a narrower radius at the outside 52 of the bend 20a compared to the inside 50 of the bend 20a, when taking the spine 40 as following the axis A-A of the duct. The shell 30 may comprise a modified cross-section in a bend which is not circular; it may appear flattened on the outer surface.

Viewed another way the position of the spine 40 may be displaced from the axis A-A closer to the outside 52 of the bend 20a than the inside 50, in order to keep the cross-sectional area of the spiral channels 32, 34 as uniform as possible while maintaining a circular cross-section.

In both scenarios, the relative position of the spine 40 with respect to the shell is effectively adjusted, so that a radial extent r of each channel r1 at a portion 40a of the spine 40 on the inside 50 of the bend 20a may be greater than a radial extent r2 on the outside 52 of the bend 20a between a portion 40b of the spine 40 and the shell on the outside 52 of the bend 20a.

The duct 20 may be made by additive manufacturing using a range of materials. For example, the duct 20 may be formed from an aluminium alloy for lower temperature applications, offering good thermal conductivity properties, or it may be formed from a superalloy material such as (but in no way limited to) Inconel 718 for use under higher temperature conditions.

Providing the duct 20 with heat exchanger functionality offers benefits in terms of the overall size of the heat exchanger arrangement. For example, it is able to be designed to fit within the space corresponding to a conventional duct. This may offer benefits and new opportunities for transferring heat between systems that were not previously possible.

The duct 20 with the internal heat exchanger 35 may be used by itself or in conjunction with other such ducts 20 in an aircraft to replace one or more conventional heat exchangers, for example, plate-fin heat exchangers. The one or more ducts 20 comprising the internal heat exchanger 35 may be part of an OBIGGS unit within the aircraft, for example, or a similar unit where the heat exchange functionality is of benefit.

The invention claimed is:

1. A duct comprising:
   an inlet;
   an outlet;
   a shell having a tubular form extending between the inlet and the outlet;
   a first flow path within the shell for conveying a first flow between the inlet and the outlet; and
   a heat exchange structure, wherein the heat exchange structure comprises:
   an intake port provided in the shell;
   an output port provided in the shell; and
   a second flow path within the shell for conveying a second flow between the intake port and the output port,
   wherein the second flow path is spirally intertwined with the first flow path for a section of the duct to provide a heat exchanger using the heat exchange structure of the duct;
   wherein the shell comprises one or more bends between the inlet and the outlet, and the first flow path and the second flow path comprise intertwined spiral channels that are formed by a spiral wall arranged within the shell;
   wherein the one or more bends comprises a bend in a first direction and a bend in a second direction which is different to the first direction to provide a duct with an S-shaped shell; and
   wherein a radial extent of a channel is less at an outside of a bend of the one or more bends than at an inside of the bend to maintain a uniform cross-sectional flow area in each of the spiral channels through all the helical turns around the bend.

2. A duct as claimed in claim 1, wherein the spiral wall extends radially from an outer surface of a spine to an inner surface of the shell.

3. A duct as claimed in claim 1, wherein the spiral wall has a first surface in contact with the first flow path and a second surface in contact with the second flow path.

4. A duct as claimed in claim 1, wherein the spiral wall provides a double helix structure within the shell for the spiral channels with a pitch angle of less than 20°.

5. A duct as claimed in claim 4, wherein the pitch angle of less than 10°.

6. A duct as claimed in claim 1, wherein the duct comprises:
   a first section downstream of the inlet in which the shell defines a first portion of the first flow path where the second flow path is absent;
   a second section downstream of the first section and positioned between the output port and the intake port comprising the heat exchanger where the first flow path and the second flow path are present and spirally intertwined; and
   a third section downstream of the heat exchanger and leading to the outlet where the shell defines a second portion of the first flow path where the second flow path is absent.

7. A duct as claimed in claim 1, wherein the intake port and the output port are provided with necks which extend from the shell for connection to a supply and return of heat exchanger medium.

8. A duct as claimed in claim 1, wherein the heat exchanger comprises a spine formed by inner portions of the first flow path and the second flow path that extends in a longitudinal direction of the duct.

9. A duct as claimed in claim 1, wherein the duct, including the heat exchanger provided by the spirally intertwined first flow path and second flow path, has been formed by an additive manufacturing process.

10. A duct as claimed in claim 8, wherein the spine is hollow and comprises a valve to provide a bypass flow for the first flow path.

11. A duct as claimed in claim 9, wherein the additive manufacturing process is a laser bed fabrication process.

12. A duct comprising:
an inlet;
an outlet;
a shell having a tubular form extending between the inlet and the outlet;
a first flow path within the shell for conveying a first flow between the inlet and the outlet; and
a heat exchange structure, wherein the heat exchange structure comprises:
an intake port provided in the shell;
an output port provided in the shell; and
a second flow path within the shell for conveying a second flow between the intake port and the output port,
wherein the second flow path is spirally intertwined with the first flow path for a section of the duct to provide a heat exchanger using the heat exchange structure of the duct;
wherein the shell comprises one or more bends between the inlet and the outlet, and the first flow path and the second flow path comprise intertwined spiral channels that are formed by a spiral wall arranged within the shell; and
wherein the spiral channels comprise a plurality of helical turns and a thickness of the spiral wall is varied to maintain a uniform cross-sectional flow area in each of the spiral channels through all the helical turns around a bend of the one or more bends.

13. A duct as claimed in claim 12, wherein the spiral wall comprises a thickness which increases from an inside of a bend to an outside of a bend, or wherein the spiral walls comprise blind cavities.

14. A duct as claimed in claim 12, wherein a radial extent of a channel is less at an outside of a bend than at an inside of the bend to maintain a uniform cross-sectional flow area in each of the spiral channels through all the helical turns around a bend.

15. A duct as claimed in claim 12, wherein the spiral wall extends radially from an outer surface of a spine to an inner surface of the shell.

16. A duct as claimed in claim 12, wherein the spiral wall has a first surface in contact with the first flow path and a second surface in contact with the second flow path.

17. A duct as claimed in claim 12, wherein the spiral wall provides a double helix structure within the shell for the spiral channels with a pitch angle of less than 20°.

18. A duct as claimed in claim 17, wherein the pitch angle of less than 10°, wherein the duct comprises:
a first section downstream of the inlet in which the shell defines a first portion of the first flow path where the second flow path is absent;
a second section downstream of the first section and positioned between the output port and the intake port comprising the heat exchanger where the first flow path and the second flow path are present and spirally intertwined; and
a third section downstream of the heat exchanger and leading to the outlet where the shell defines a second portion of the first flow path where the second flow path is absent.

19. A duct as claimed in claim 12, wherein the intake port and the output port are provided with necks which extend from the shell for connection to a supply and return of heat exchanger medium.

20. A duct as claimed in claim 12, wherein the heat exchanger comprises a spine formed by inner portions of the first flow path and the second flow path that extends in a longitudinal direction of the duct.

* * * * *